(12) United States Patent
Weikel et al.

(10) Patent No.: US 11,818,409 B1
(45) Date of Patent: Nov. 14, 2023

(54) CONTENT CONDITION APPLICABILITY VIA NON-FUNGIBLE TOKENS

(71) Applicant: Capital One Services, LLC, McLean, VA (US)

(72) Inventors: Cara Weikel, Silver Spring, MD (US); Judith Rodriguez, Falls Church, VA (US); Clayton Johnson, Edgewood, MD (US); Andre Young, Accokeek, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/809,936

(22) Filed: Aug. 4, 2022

(51) Int. Cl.
*H04N 21/482* (2011.01)
*H04N 21/25* (2011.01)
*H04N 21/258* (2011.01)
*H04N 21/24* (2011.01)
*H04N 21/239* (2011.01)

(52) U.S. Cl.
CPC ... *H04N 21/25891* (2013.01); *H04N 21/2393* (2013.01); *H04N 21/2407* (2013.01)

(58) Field of Classification Search
CPC ............................. H04N 21/20; H04N 21/48
See application file for complete search history.

(56) References Cited

U.S. PATENT DOCUMENTS

| | | | | |
|---|---|---|---|---|
| 11,615,399 B1* | 3/2023 | Smith | ................. | G06Q 20/4014 705/65 |
| 2021/0357447 A1* | 11/2021 | McKenzie | ............ | G06F 16/638 |
| 2022/0337898 A1* | 10/2022 | Dorogusker | ......... | G06Q 20/123 |
| 2022/0368994 A1* | 11/2022 | Chu | .................... | H04N 21/4826 |
| 2022/0374888 A1* | 11/2022 | Lackey | ............... | G06Q 20/3827 |
| 2023/0070586 A1* | 3/2023 | Kapur | ................... | G06Q 20/123 |
| 2023/0077278 A1* | 3/2023 | Goncalves | ............. | G06Q 10/00 |
| 2023/0118380 A1* | 4/2023 | Krosinski | ........... | G06Q 20/4016 705/44 |
| 2023/0138797 A1* | 5/2023 | Kurian | .................... | G06F 21/31 713/193 |
| 2023/0145439 A1* | 5/2023 | Suk | ........................ | G06Q 30/00 705/44 |
| 2023/0162179 A1* | 5/2023 | Deng | ................. | G06Q 20/3823 705/64 |
| 2023/0177921 A1* | 6/2023 | Mikulich | ................ | G07F 17/00 463/25 |

* cited by examiner

*Primary Examiner* — Mushfikh I Alam
(74) *Attorney, Agent, or Firm* — Perkins Coie LLP (57) ABSTRACT

Embodiments relate to content presentation and filtering preferences of viewers tied to blockchain technology for improved use and applicability in multiple channels. For example, a blockchain platform is described via which content preferences stored on non-fungible tokens tied to user identities are provided to content presenters. In one embodiment, the platform receives a request indicating an on-chain address for a user non-fungible token. With the on-chain address, the platform queries an on-chain program stored on the blockchain to obtain content preferences stored on the user non-fungible token. After providing the content preferences to a content presenter, the platform monitors a content session between the presenter and the user, for example, by collecting data from the user during the session. The platform then performs blockchain operations to update a non-fungible token associated with the presenter to reflect whether the content provided during the session by the presenter satisfied the content preferences.

17 Claims, 4 Drawing Sheets

CONTENT CONDITION APPLICABILITY VIA NON-FUNGIBLE TOKENS

BACKGROUND

Users are presented with content in multiple different channels, including video streaming, social network applications, and e-mail, from different content presenters. However, content presented to a user may be inconsistently formatted and filtered by different content presenters, and a user's content preferences for one channel may not be immediately usable by another content presenter for another channel. For instance, an Internet router may be configured with user preferences to block certain webpages or addresses, while a social media platform may be configured with user preferences to block posts or images from certain people. Technical challenges exist with consistent definition and application of user preferences across different channels and with access to user preference information by multiple different content presenters. These and other technical challenges exist.

SUMMARY

Embodiments described herein address technical challenges with solutions that implement blockchain technology to enable universal definition of user preferences for content presentation and filtering and to improve application of user preferences in different channels by different content presenters. In accordance with various embodiments, user preferences are tied to unique tokens stored on a blockchain and associated with users such that, instead of being tied to a particular channel, the user preferences are tied to a user identity. According to various embodiments, a platform or system for storing and managing content preference information for users is described, and the platform or system may communicate with a plurality of different content presenters. In particular, the platform or system may be queried by multiple content presenters for content preference information for a specified user. Various embodiments provide further solutions to efficiently manage incoming queries that may be received near simultaneously such that operational delays are minimized. By providing a universal platform for content preference information for a plurality of users and by being configured to efficiently interface and respond to a plurality of content presenters, embodiments described herein provide technical solutions at least through eliminating a need for excess user-side processing and effort to repeatedly define user preference information for different content presentation channels and a need for redundant and independent storage of user preference information by different content presenters.

In particular, embodiments described herein provide technical solutions at least by implementation of non-fungible tokens stored on one or more blockchains. For example, in an example embodiments, a non-fungible token may be associated with each of a plurality of users, and the associated non-fungible token for a user may be used as a digital identity for the user and may store user-specific information, including content preferences. In various embodiments, with content preference information for the user being stored on a non-fungible token for the user, the content preferences for the user can be inherently attributed and related to the user, easily and securely retrieved (e.g., when given proper identification of the user, such as an on-chain address), and otherwise consistently managed. In various embodiments, historical data describing content presentation behavior of a content presenter may also be stored on-chain, such as on a non-fungible token associated with the content presenter. For example, such data may indicate whether the content presenter has historically provided content that satisfies user preference information.

Various embodiments may use this historical data for a content presenter that is stored on-chain to determine how to efficiently manage at least requests and communications from the content presenter. For example, with the on-chain historical data for a content presenter, requests and communications originating from the content presenter may be accordingly suppressed or prioritized. Through suppression or prioritization of content presenter communications informed by on-chain historical data, various embodiments can efficiently handle requests received from multiple content presenters. Other operations for a content presenter may be performed based on the on-chain historical data for the content presenter, including publishing the on-chain historical data, provisioning a proportional amount of computing resources or data, and formatting a user interface to indicate to a user a ranking of the content presenter among other content presenters.

Accordingly, in some embodiments, methods and systems are described for using blockchain technology to improve definition and applicability of user content preferences and to facilitate presenter request suppression or communication management. First, a user of a plurality of users may define content preferences (e.g., preferences for filtering content associated with a certain rating, preferences for filtering certain text keywords, preferences for filtering content generated by a certain entity, etc.), the content preferences defined by the user may be communicated to a platform or system. The platform or system may interact with an on-chain program of a blockchain to generate or update a non-fungible token for the user to store the content preferences defined by the user. Then, at a later point in time for example, the user may be identified in a request that requests the content preferences for the user, and the request may be received by the platform or system in connection with an anticipated or upcoming content session in which a content presenter provides content to the user. The platform or system may response to the request with the content preferences of the user based at least on determining that historical behavior of the content presenter, as recorded on the blockchain, is satisfactory and retrieving the content preferences of the user stored on the non-fungible token for the user by querying the on-chain program.

In various embodiments, subsequent to retrieving and providing the content preferences of the user to the content presenter, the content session between the content presenter and the user may be monitored to detect whether the provided content satisfies the content preferences. Based on the monitoring of the session, on-chain data associated with the content presenter (e.g., stored on a non-fungible token associated with the content presenter) is updated to reflect whether the content provided by the content presenter during the session satisfied the content preferences of the user. Thus, in various embodiments, data describing a content presenter's use of content preference data is continuously updated and can be used later to handle communications, resource allocations, analytics, or the like for the content presenter. For example, according to on-chain data for the content presenter that indicates that the content presenter provided content that did not satisfy user content preferences, subsequent requests received from the content presenter may be suppressed.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
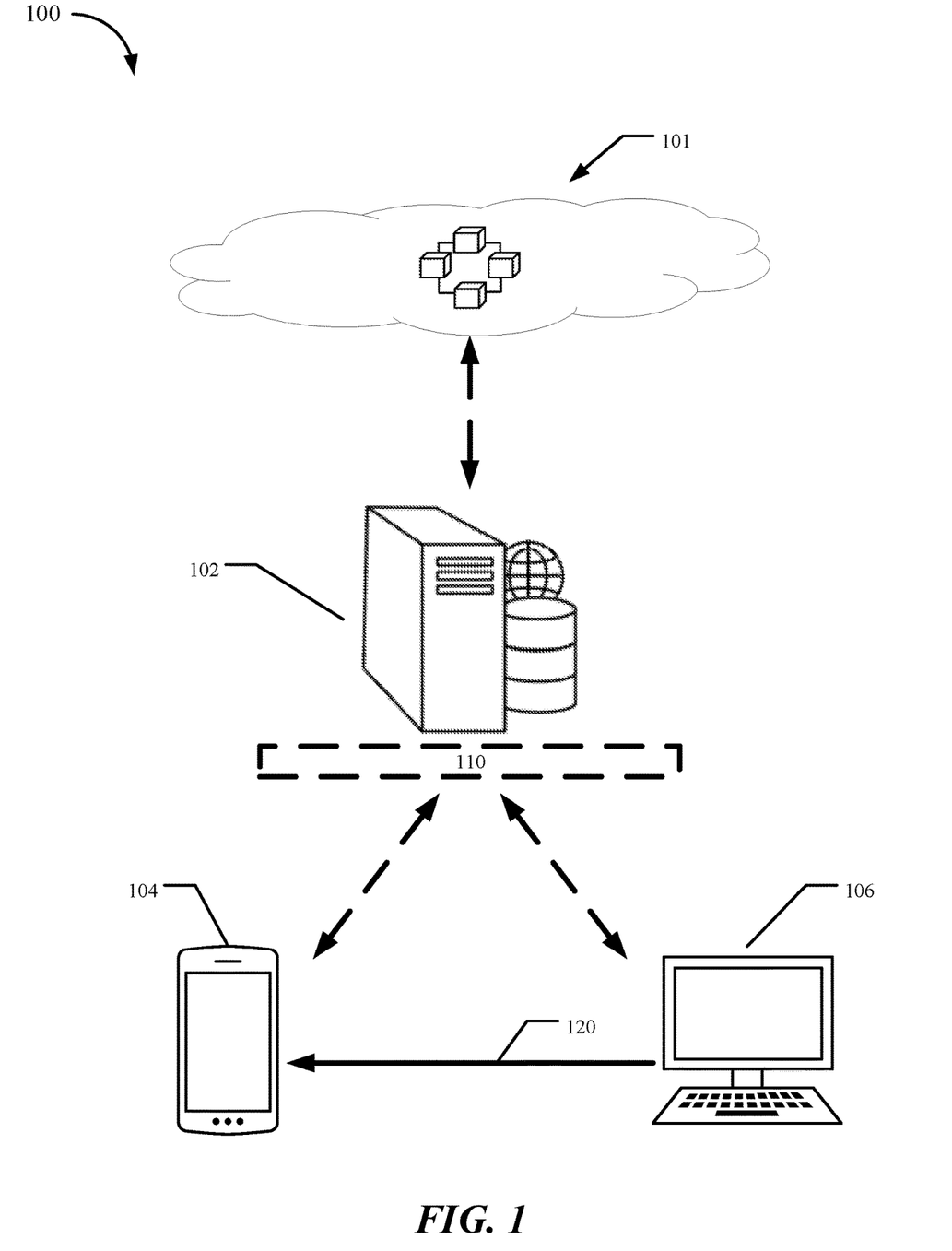
FIG. 1 shows an example system for improving provisioning and application of user content preferences for content presentation and filtering with blockchain technology, in accordance with one or more embodiments.

FIG. 1 shows an example of a system architecture 100 for promoting consistent content presentation for a user and for facilitating communication prioritization for a plurality of content presenters. For example, various operations may be performed within the system architecture 100 and between various entities of the system architecture 100 to promote the application of user content preferences consistently in different channels by different content presenters and to efficiently manage communications received from different content presenters, such as by suppressing requests received from certain content presenters.

As shown in FIG. 1, the architecture 100 may include a computing system 102 configured to perform blockchain operations with one or more blockchains 101. For example, the computing system 102 may be or may include one or more nodes of a blockchain 101. Accordingly, the system 102 may implement an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain. In some embodiments, the computing system 102 includes one or more miner nodes of a blockchain 101.

In some embodiments, the computing system 102 may include a block listener that may monitor nodes of a blockchain 101. In some embodiments, the block listener of a computing system 102 may publish blocks, transfer logs, save blocks, or the like. Thus, the computing system 102 may read blocks and historical information from a blockchain 101.

As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related non-fungible tokens, performing encryption and/or decryption operations, exchanging public/private keys, and/or other operations related to blockchains and blockchain technology. In some embodiments, a blockchain operation may comprise the creation, modification, detection, and/or execution of a smart contract or program stored on a blockchain, generally referred to herein as an on-chain program.

Accordingly, in performing some blockchain operations, the computing system 102 is configured to interface with and execute on-chain programs stored on a blockchain 101. In some embodiments, the computing system 102 interfaces with an on-chain program to create, modify, access, or delete tokens stored on a blockchain 101, including non-fungible tokens. As used herein, a non-fungible token may generally refer to distinguishable tokens or assets that are verified and stored using blockchain technology.

In particular, the computing system 102 may query an on-chain program to obtain or retrieve content preference information for a user from a non-fungible token uniquely associated with the user, for example. As another example, the computing system 102 may query an on-chain program to update content preference information for a user that is stored on the non-fungible token uniquely associated with the user. As yet another example, the computing system 102 may query an on-chain program to access historical data for a content presenter that is stored on a blockchain 101 or to obtain an output that characterizes or is based on on-chain historical data for a content presenter.

As shown in FIG. 1, the system architecture 100 may further include one or more user devices 104, and a user device 104 may be associated with a user, or a viewer that views content provided by other entities. For example, the user device 104 may include a desktop computer, a notebook computer, a tablet computer, a smartphone, a mobile communication device, a wearable device, or other device that is associated with a user. In some examples, the user may view provided content via the user device 104. For example, the user may be provided with content at the user device 104 including video content (e.g., television programs, movies, short-form videos, etc.), audio content (e.g., music, podcasts, audio recordings, etc.), text-based content (e.g., social media content, articles and papers, books, etc.), streamed content, interactive content (e.g., video games, an educational course, etc.), and/or the like, and the content provided to the user at the user device 104 originates from a content presenter. For example, content being stored at the user device 104 may originate from content data being transmitted from a content presenter to the user device 104, and in other examples, content may be streamed to the user device 104 from a content presenter.

In some embodiments, the user device 104 is configured to perform various user-side operations. In particular, a user may define content preferences at the user device 104 (e.g., via an application implemented at the user device 104). For example, a user may define content preferences that may include preferences to filter content associated with certain entities (e.g., filtering social media posts and content from certain other users, filtering articles published by a certain journal or paper, etc.), to filter content having a certain rating (e.g., PG-13 rated or R rated movies, music with explicit language, etc.), to filter specific text-based content (e.g., explicit keywords), to filter content associated with a certain concept or a specific event (e.g., spoilers for a movie or an athletic event), to filter otherwise objectionable content (e.g., racist content, violent content, nudity content, addiction-related content, etc.), to filter content types (e.g., filtering images and videos to improve user device performance), and/or the like. In some examples, content preferences of a user may be defined as a plurality of content preference conditions each associated with and indicating a certain content attribute (e.g., authoring/publishing entity, rating) or portion (e.g., keywords, titles, images) that may be filtered from being provided to the user. As indicated, content preferences for a user may include a large number of conditions, and large computational and storage effort would otherwise be needed to manage the content preference conditions for the user at each content presenter. According to various embodiments, technical solutions are provided to address at least these technical challenges through management of content preferences (e.g. defined as one or more content preference conditions) for a user on a non-fungible token stored on a blockchain.

Returning to FIG. 1, the user device 104 is configured to communicate with the computing system 102, and the user device 104 may do so in performing various user-side operations. For example, as the user defines content preferences at the user device 104 (e.g., via user input at a user interface of the user device 104), the user device 104 may transmit the content preferences to the computing system 102, so that the computing system 102 stores the content preferences on a blockchain 101 in association with the user. In some embodiments, the user device 104 may automatically communicate or otherwise interface with the computing system 102 using one or more applications implemented at the user device 104, which may include an application configured with a software development kit (SDK) configured for interfacing with the computing system 102 or an application made available in association with the computing system 102 on an application distribution platform (e.g., an app store).

In some embodiments, the user device 104 may communicate with the computing system 102 via an application programming interface 110. In particular, in some embodiments, the computing system 102 includes an application programming interface (API) 110 or an API layer that provides a decoupled interface to data and/or functionality of the computing system 102. The API 110 of the computing system 102 may reside on one or more cloud components, one or more servers, and/or the like of the computing system 102. The user device 104 may transmit an API request or query that comprises content preference data to the API 110 of the computing system 102, and upon receipt of the API request or query at the API 110, the computing system 102 may automatically perform operations to process, analyze, and store the content preference data on a blockchain 101.

In some embodiments, the computing system 102 may receive content preference data for a plurality of users (e.g., via preference defining requests from users), and the computing system 102 is configured to perform blockchain operations to securely manage and store the content preference data for each user. In particular, the computing system 102 is configured to perform blockchain operations to store content preference data for a particular user with token data of a non-fungible token uniquely associated with the particular user. The non-fungible token may serve as a digital identity for the particular user, and accordingly storage of the content preference data of the user with the non-fungible token ties the user content preferences directly with the user instead of tying user content preferences to any particular channel or medium through which content is provided to the user. In some embodiments, the blockchain operations performed by the computing system 102 may include querying an on-chain program to store content preference data on a non-fungible token.

To specify the non-fungible token that is uniquely associated with a user, the computing system 102 may obtain an on-chain address associated with the non-fungible token for the user to indicate to the on-chain program. In one example, the computing system 102 may store on-chain addresses for each of a plurality of users to use in querying the on-chain program. In another example, a preference defining request that includes content preference data for a user and that is received by the computing system 102 may indicate the on-chain address associated with the non-fungible token. In some embodiments, a preference defining request from a user may be configured to cause the computing system 102 to add one or more content preference conditions be added to the user's content preferences, remove one or more content preference conditions from the user's content preferences, or modify certain content preference conditions in the user's content preferences. In other examples, a user may independently store content preference data on a non-fungible token without involving the computing system 102; for example, the user performs blockchain operations via a user device to store content preference data on the user's non-fungible token.

In some embodiments, the user may include an indication or representation of a private cryptographic key (e.g., a cryptographic authentication key) in a preference defining request (e.g., to the computing system 102 for the computing system 102 to query the on-chain program, in a direct query to the on-chain program without the computing system 102) to demonstrate and enable authentication of the user's authority to store content preference. In some embodiments, the computing system 102 may store data for verifying authority to query the on-chain program to store content preference data on a given non-fungible token for a user. For example, the computing system 102 may store an indication or a representation of a private cryptographic key (e.g., a cryptographic authentication key) associated with the non-fungible token for each user.

As shown in FIG. 1, the system architecture 100 further includes one or more presenter systems 106 which are associated with one or more content presenters. A content presenter may generally refer to an entity (e.g., another user, a company, a system, a repository, etc.) that stores, manages, curates, and distributes content to users. For example, a content presenter may stream video content to one or more users, may provide (e.g., publish) text articles for access by one or more users, may embody a storefront at which one or more users can purchase audio tracks, and/or the like. Thus, for example, a presenter system 106 may store (e.g., in its own storage, in a database or repository, etc.) content that is distributed by the content presenter. The presenter system 106 may then provide (e.g., transmit, stream, publish, etc.) content to a user device 104 during a content session 120, during which a user is presented with the content via the user device 104.

As will be understood, a given user may be presented with content from multiple different content presenters, and in some embodiments, the multiple different content presenters may communicate with the computing system 102 to obtain content preferences of the given user. Thus, although not explicitly illustrated, the computing system 102 may interface with a plurality of presenter systems 106 and may do so via an API 110 or an API layer. Technical solutions are provided herein for efficient management of the plurality of presenter systems 106 and requests received therefrom. For example, to efficiently handle large volumes of requests, the computing system 102 may suppress and prioritize requests received from certain presenter systems 106 based on prior content sessions involving the certain presenter systems 106.

In some embodiments, the computing system 102 is configured to perform blockchain operations to store data associated with content presenters on non-fungible tokens stored on a blockchain. In one embodiment, for example, the computing system 102 may be associated with a plurality of non-fungible tokens that correspond to a plurality of content presenters, and the computing system 102 stores cryptographic keys and on-chain addresses that enable the computing system 102 to query an on-chain program to interact with the plurality of non-fungible tokens. The computing system 102 may generate and/or update, via an on-chain program, a non-fungible token associated with a content presenter with presenter-specific data that may include data describing a channel through which the presenter provides content to users, data describing whether the presenter has previously provided content that fails to satisfy user content preferences, data describing events at which the presenter has requested for user content preferences, or the like. In another example, the computing system 102 is associated with a non-fungible token having token data with which data corresponding to a plurality of content presenters is stored, and the computing system 102 may store an on-chain address associated with the non-fungible token and cryptographic keys with which the computing system 102 can query an on-chain program to securely interact with the non-fungible token.

It will be understood that, while one or more operations may be described herein as being performed by particular components of system 102, those operations may, in some embodiments, be performed by other components of computing system 102 or other entities of system architecture 100. As an example, while one or more operations are described herein as being performed by components of system 102, those operations may, in some embodiments, be performed by components of a user device 104.

Figure 2:
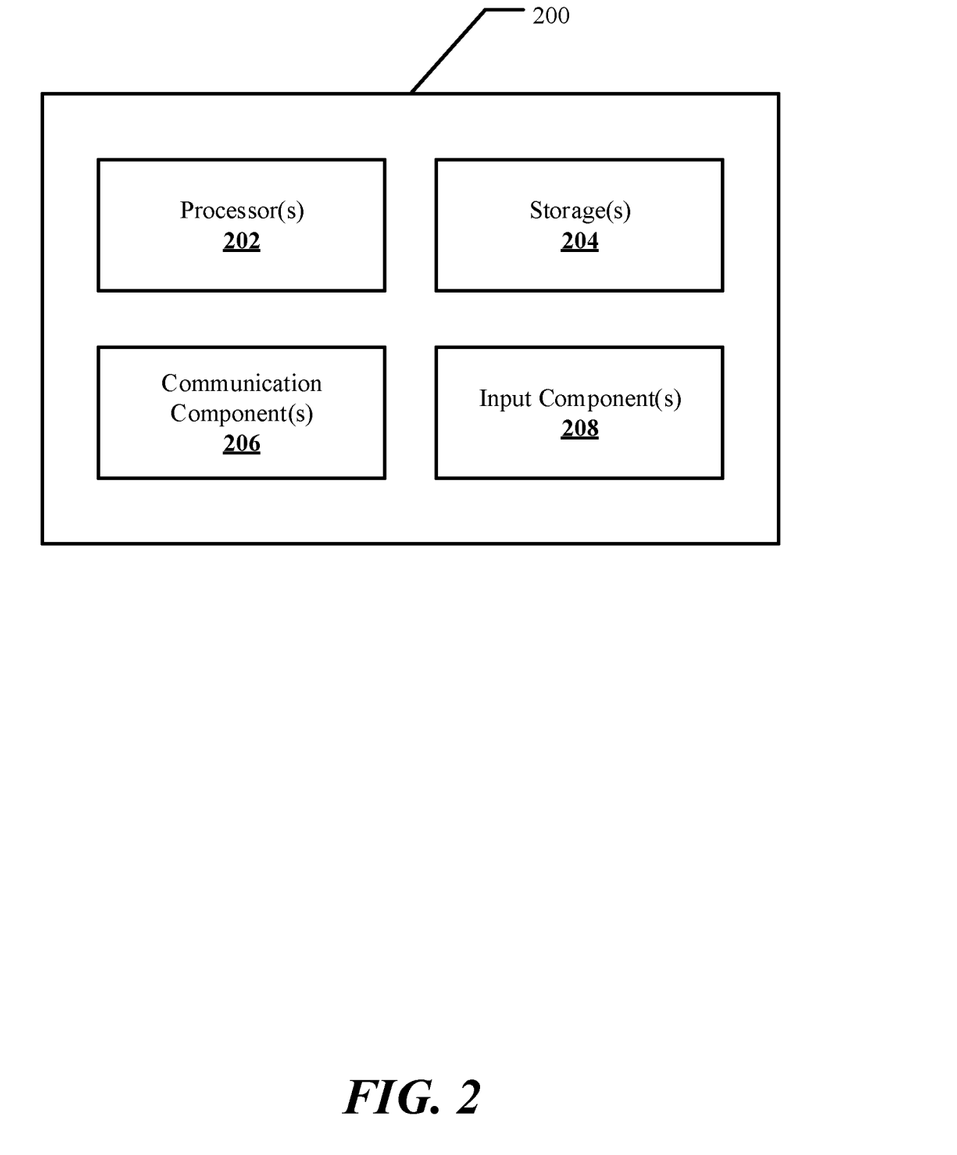
FIG. 2 shows an example computing entity for performing operations in accordance with one or more embodiments.

In some embodiments, with respect to FIG. 2, one or more operations described herein that relate to improving consistency of content presentation and filtering for a user and to efficiently managing presenter requests may be performed by a computing entity 200. In some embodiments, the computing entity 200 may embody the computing system 102 or components thereof (e.g., one or more blockchain nodes). As illustrated, the computing entity 200 may include a plurality of components, such as processor(s) 202, storage(s) 204, communication component(s) 206, input component(s) 208, or other components. In some embodiments, storage 204 may include non-volatile memories and/or volatile memories that may store a variety of applications. For example, different applications stored on storage(s) 204 of the computing entity 200 may correspond to the performance of various example operations herein. For example, an application may be configured for querying on-chain programs of one or more blockchains 101, and another application may be configured for monitoring content sessions between a content presenter and a content viewer. While FIG. 2 illustrates a computing entity 200, it will be understood that, in some embodiments, the computing system 102 may comprise multiple individual computing entities 200. For example, the computing system 102 may include one or more servers and/or may be a cloud-based and/or distributed computing system.

Figure 3:
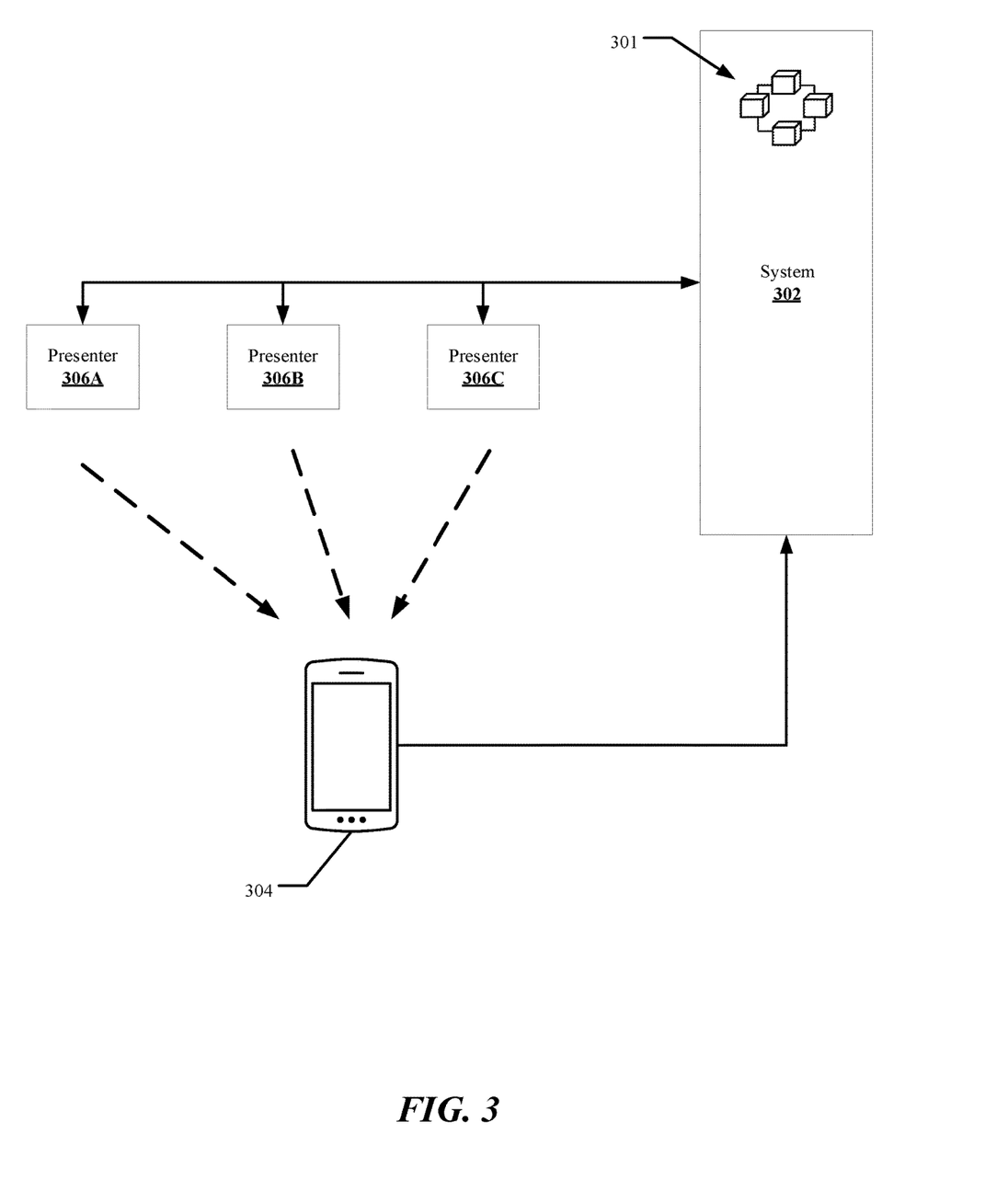
FIG. 3 provides a diagram illustrating example interactions and operations between systems and devices to improve application of user content preferences using blockchain technology while facilitating request suppression/prioritization.

Referring now to FIG. 3, a diagram is provided to illustrate technical solutions that improve consistency in content presentation and filtering for a user and that efficiently manage requests received from a plurality of content presenters. In particular, FIG. 3 illustrates a diagram in which a user is presented with content that satisfies content preferences of the user based on content presenters being efficiently provided with the content preferences of the user.

In some embodiments, a user device 304 may transmit content preferences to a computing system 302 configured to perform blockchain operations with one or more blockchains 301. The content preferences may include preferences to filter content associated with certain entities (e.g., filtering social media posts and content from certain other users, filtering articles published by a certain journal or paper, etc.), to filter content having a certain rating (e.g., PG-13 rated or R rated movies, music with explicit language, etc.), to filter specific text-based content (e.g., explicit keywords), to filter content associated with a certain concept or a specific event (e.g., spoilers for a movie or an athletic event), to filter otherwise objectionable content (e.g., racist content, violent content, nudity content, addiction-related content, etc.), to filter certain content types (e.g., filtering images and videos from a set of content to improve user device performance), and/or the like. For example, content preferences transmitted to the computing system 302 may be defined as a plurality of content preference conditions each associated with and indicating various aspects and characteristics relating to content that may be filtered.

A user may define content preference conditions individually that are each stored on the blockchain 301. In some embodiments, a user may individually define, modify, or remove a given content preference condition of the user's content preferences (e.g., using a preference defining request). In some embodiments, a content preference condition may further define an extent to which an associated content attribute or portion is filtered. For example, with an example content preference condition indicating a certain keyword to be filtered, the example content preference condition may further indicate that (i) any content (e.g., a video, a movie, an article, a book) that includes at least one instance of the certain keyword be completely filtered, (ii) instance(s) of the certain keyword are filtered from the content, or (iii) a subset of instance(s) of the certain keyword are filtered from the content.

In accordance with embodiments described herein, the content preferences (e.g., defined as one or more content preference conditions) are defined and transmitted to the computing system 302 to serve as a set of universal preferences that control content presentation and filtering in multiple different channels (e.g., video streaming, e-mail, Internet web pages, social media platforms, etc.), such that the user does not need to repeatedly define content preferences for each channel. For example, the content preferences are defined and transmitted to the computing system 302 so that the content preferences may be applied to video content streamed to the user device 304, audio content streamed or transmitted to the user device 304, text-based content provided to the user device 304, social media content provided to the user device 304, and others. The content preferences are transmitted to the computing system 302 such that the content preferences for the user can be centrally managed and accessed by content presenters, in contrast to the content preferences being transmitted to each content presenter for each content presenter to individually manage and use the content preferences.

With the content preferences being provided to the computing system 302, the computing system 302 performs blockchain operations with a blockchain 301 to store the received content preferences. In particular, the content preferences are stored with token data of a non-fungible token associated with the user that is stored on the blockchain 301. The non-fungible token associated with the user may represent a digital identity for the user and may include other data uniquely associated with and/or uniquely identifying the user. For example, the non-fungible token associated with the user may be digital identity token issued by a banking entity or another governing entity that manages unique identities for a plurality of users. With non-fungible tokens stored on the blockchain 301 being uniquely tied to users, the content preferences received by the computing system 302 from the user device 104 are stored on the appropriate non-fungible token as token data. In some embodiments, the non-fungible token for a user stores additional token data that may include demographic information, user-specific information, personally identifiable information, and/or the like, in serving as a digital identify for the user.

With content preferences being stored on a non-fungible token, the content preferences can be universally accessed and applied for different channels, devices, networks, and platforms due to being associated with an identity of the user itself. As such, content preferences stored on a non-fungible token may be channel-agnostic and comprehensive, in contrast to other examples such as address-based filtering by a router (which may not be capable of filtering specific content portions within a web page) or system-side filtering (e.g., filters defined for a social media platform but are not shared or are not easily applicable to other platforms or systems).

In some embodiments, the computing system 302 stores one or more cryptographic keys, such as public keys or on-chain addresses, for identifying and accessing the non-fungible token associated with each user, and based on receiving the content preferences from the user device 304, the computing system 302 uses the on-chain address for the associated user to locate the non-fungible token for storing the content preferences. In some embodiments, the content preferences are transmitted to the computing system 302 via a request that includes one or more on-chain addresses or cryptographic keys for locating the non-fungible token associated with the user and for verifying the authorization of the user to update and/or store content preferences on the non-fungible token. While FIG. 3 illustrates one user or user device 304 for simplicity, the computing system 302 may receive content preferences from a plurality of users, and the blockchain 301 stores a plurality of non-fungible tokens for the plurality of users.

In some embodiments, the computing system 302 may determine, upon receiving a request that includes content preferences from a user device 304, whether a non-fungible token associated with the user exists or is being stored on the blockchain 301. Upon determination that one such non-fungible token for the user does not exist, the computing system 302 may query an on-chain program on the blockchain 301 to generate (e.g., mint) a non-fungible token for the user. In doing so, the computing system 302 may transmit an indication of one or more on-chain addresses, keys, or other mechanisms for verification and access associated with the newly generated (e.g., newly minted) non-fungible token to the user device 304. Otherwise, if a non-fungible token for the user is currently stored on the blockchain 301, then the computing system 302 may store the content preferences on the non-fungible token based on querying the on-chain program.

Accordingly, the computing system 302 may embody a central hub at which content preferences for a user can be stored, updated, or otherwise managed based on the computing system 302 being configured to perform blockchain operations, or specifically, to perform blockchain operations with non-fungible tokens that each serve as a unique identifier for a user. As discussed herein, the computing system 302 further serves as a central hub for a plurality of content presenters (e.g., content presenter 306A, content presenter 306B, content presenter 306C as shown in FIG. 3) to obtain the content preferences for a user in anticipation of a content session, or in anticipation of providing content to a user (e.g., via the user device 304). Although technical challenges arise with the computing system 302 being a central interface for a plurality of content presenters that may frequently provide content to a population of users, the computing system 302 is configured to address such technical challenges through communication suppression and prioritization based on prior behavior (e.g., preference adherence) for each content presenter.

In particular, a content presenter may be aware of an upcoming content session with a given user, or a given user device. A content presenter may receive an indication, based on an application executing on the user device 304, that a user is requesting access to content or is requesting that content be provided. For example, a user may, via user input via a user interface of the user device 304, select a movie for streaming, or may select a published article to read, and/or the like. Based on the indication of an upcoming content session, the content presenter may desire to obtain the content preferences for the user prior to providing the content to the user. In some examples, the content presenter may obtain content preferences for the user prior to the upcoming content session based on a desire to maintain a relationship with the user. In some examples, obtaining content preferences for the user may enable the content presenter to transmit a reduced volume of data to the user device 304 due to some portions of data being filtered. In some examples, the content presenter obtains user content preferences based on an expectation that the content presenter receives a reward for providing content that satisfies the user content preferences. For example, the content presenter may be rewarded with continued access to user content preferences, with improved response times with user content preferences, with valuable assets (e.g., cryptocurrency, digital assets, etc.), with increased allocation of computing resources, and/or the like.

Thus, in accordance with an upcoming content session, a viewer data request may be transmitted to the computing system 302 for the content presenter to obtain content preferences for the user. For example, a content presenter may transmit the viewer data request to the computing system 302. The viewer data request may be a request that identifies the content presenter and the user. In some embodiments, the user or viewer may be identified in the request by a viewer on-chain address from which the user's non-fungible token may be located and accessed. In some embodiments, the content presenter may be similarly identified in the request by a presenter on-chain address from which a non-fungible token for the content presenter may be located and accessed. In some embodiments, a viewer data request may be an application programming interface (API) call or query that is received at an API layer of the computing system 302. In some embodiments, a content presenter is configured to automatically transmit a viewer data request to the computing system 302 before initiating a content session with a viewer/user. In other embodiments, a content presenter is configured to transmit a viewer data request to the computing system 302 upon an initial registration or recognition of the viewer/user (e.g., the viewer/user generate an account with the content presenter) and periodically thereafter. In some embodiments, the viewer data request is configured such that the computing system 302 can recognize entities involved in an upcoming content session, namely the content presenter and a viewer/user, and can access on-chain data associated with said entities. Thus, for example, the viewer data request may include an identifier and/or an on-chain address associated with the content presenter and the viewer/user. To generate and transmit a viewer data request, a content presenter may store or may query a user for an on-chain address associated with the user, such that the user's on-chain address is provided to the computing system 302 for retrieval of the user's content preferences, for example. In other examples, the content presenter may generate and transmit a viewer data request that includes a unique identifier, token, or the like configured to uniquely identify the viewer/user to the computing system 302; for example, the computing system 302 may map a unique identifier of the viewer/user that is included in a viewer data request to an on-chain address stored by the computing system 302 in connection with the viewer/user.

With the viewer data request identifying the content presenter, the computing system 302 may determine whether or not to suppress the request. In some examples, the computing system 302 may receive a plurality of other requests associated with other content presenters at the same time, and the request may need to be suppressed to handle the other requests. In some examples, the computing system 302 may determine to suppress the request and/or deny the request based on historical behavior of the content presenter. In particular, in some embodiments, the computing system 302 accesses on-chain data stored at the presenter on-chain address (e.g., a presenter non-fungible token) that describes whether the content provided by the content presenter in prior content sessions with various users satisfied respective user preferences. The on-chain data that describes prior content sessions involving the content presenter may be stored on a blockchain 101, and the blockchain 101 may be the same blockchain on which user or viewer non-fungible tokens are stored. In other examples, viewer non-fungible tokens and presenter non-fungible tokens may be stored on different blockchains.

In some embodiments, the on-chain historical data is accessed or obtained based on querying an on-chain program stored on the blockchain, and given the presenter's on-chain address, the on-chain program may be configured to return the on-chain historical data. In some embodiments, the on-chain program is configured to process and analyze the on-chain historical data and return a score or a measure that holistically represents the historical behavior and prior content sessions of the content presenter. For example, the on-chain program may use a machine learning model that is configured and trained to generate a predictive output that represents a likelihood that the content presenter will abide by user content preferences in the upcoming content session based on the historical behavior and prior content sessions of the content presenter. In other examples, the computing system 302 obtains the on-chain historical data form the on-chain program, and the computing system 302 implements a machine learning model that is configured and trained to generate a predictive output or score that represents a likelihood that the content presenter will abide by user content preferences in the upcoming content session based on the historical behavior and prior content sessions of the content presenter. According to the determination (e.g., made by the computing system 302, made by the on-chain program) that is based on the prior behavior of the content presenter, the request from the content presenter may be suppressed or may be acted upon. In some examples, the determination may include comparing against a threshold a presenter score that indicates a degree to which (or whether or not) a content presenter has been providing content that satisfies user content preferences. If the determination indicates that the content presenter has not been providing content that satisfies user content preferences or that the content presenter is not likely to provide content that satisfies user content preferences in the upcoming content session, the request from the content presenter may be suppressed, suppressed for some amount of time, or denied.

Otherwise, the computing system 302 may act upon the request and provide the content preferences of the user to the content presenter in anticipation of the upcoming content session. As the request may include the user or viewer on-chain address, the computing system 302 may identify and locate the non-fungible token uniquely associated with the user, and the computing system 302 may do so using an on-chain program stored on the blockchain 301 that stores viewer non-fungible tokens. For example, the on-chain program may be queried with the viewer on-chain address to return token data, including the content preference conditions, stored on the non-fungible token stored on the blockchain 301 at the viewer on-chain address.

In some embodiments, the computing system 302 access and retrieves on-chain data to respond to the viewer data request on an ad-hoc basis. In other embodiments, the computing system 302 may store off-chain some content preferences of some users, for example after retrieving the content preferences from the blockchain, and upon a subsequent viewer data request identifying the same user, the computing system 302 may respond with the locally stored content preferences, thus precluding the performance of additional blockchain operations. In some embodiments, content preference conditions or data for a user may be stored off-chain by the computing system 302 for an expiration period, and subsequent requests for the content preferences of the user during the expiration period may be responded to with the off-chain preference data.

In some embodiments, the computing system 302 provides the content preferences to the content presenter via an API layer of the computing system 302, for example, as an API response to the request.

To facilitate continued operation and continued evaluations of content presenters, the computing system 302 may monitor the upcoming content session between the content presenter and the user such that additional data that describes the upcoming content session can be generated and stored on-chain. In some embodiments, monitoring a content session may generally refer to collecting data that describes aspects of the content session and content provided to the viewer therein, and in particular, collecting data from which it may be determined whether the content provided to the viewer satisfies the content preferences of the viewer.

In some embodiments, the computing system 302 monitors content sessions between content presenters (e.g., presenter 306A, presenter 306B, presenter 306C) and a user/viewer based on collecting user-side or user-perspective data from the user/viewer. For example, the computing system 302 may obtain data describing a content session from the user device 304 at which the content was provided. In some embodiments, the data describing the content session, or monitoring data, is obtained by the computing system 302 automatically. For example, in one example embodiments, an application implemented on the user device 304 is configured to, during a content session, extract and transmit at least a portion of the content to the computing system 302, and the computing system 302 is configured to analyze the portion of the content to determine whether the portion of the content satisfies the content preferences of the viewer of the user device 304.

In determining whether the portion of the content provided to the viewer is satisfactory, the computing system 302 may determine whether certain content attributes or features indicated in the content preferences are present and are provided to the viewer. In one illustrative example, the content preferences may include an example content preference condition that indicates that a certain keyword may be filtered from content provided to the viewer, and the computing system 302 may determine whether the certain keyword appears in the content portions provided by the user device 304 (or an application implemented on the user device 304). Content preferences for a user may include one or more content preference conditions, with each content preference condition indicating a certain content attribute or portion that may be filtered from being provided to the user. In some embodiments, a content preference condition may additionally define an extent to which instances of a content portion are filtered, or whether whole content that includes the certain content attribute or portion is filtered, for example.

In some embodiments, the computing system 302 may additionally obtain metadata associated with the content provided in the content session, and such metadata may include information describing the content such as an author, publishing entities of the content, topic keywords, ratings, genre or classifications, and/or other content attributes. Accordingly, the computing system 302 may reference the metadata of the content to determine whether content that may be filtered according to the content preferences were provided to the viewer during the content session, thereby violating or not satisfying the content preferences. For example, based on content metadata obtained from the user device 304, the computing system 302 may identify that the content was authored by an entity that is identified to be filtered in the content preferences, and therefore that the content provided in the content session does not satisfy the content preferences.

In some embodiments, at least to preserve privacy and security of the content provided to the user/viewer, the application implemented on the user device 304 may transmit representations of the content or portions thereof, including cryptographic representations. For example, the application may be configured to generate hashed content portions or hashed representations of content attributes from the content provided during the content session and to transmit the hashed content portions to the computing system 302 for analysis. In one example, cryptographic hash representations (e.g., values, vectors, arrays, strings, etc.) corresponding to a content title or identifier, a content classification (e.g., a content genre, a content rating, etc.), a content authoring or publishing entity, and text-based data (e.g., individual word tokens of a text transcription) may be generated.

The computing system 302 may compare the hashed content portions to hashed representations of certain content attributes that are to be filtered as indicated by the content preferences to determine whether those certain content attributes appear in the content provided during the content session. For example, the computing system 302 may compare the hashed content portions to hash representations of certain explicit words or certain keywords to be filtered, with the hash representations being generated according to the same hash function or cryptographic function used to generate the hashed content portions. Thus, the computing system 302 is capable of monitoring content provided to the user without violating security or privacy of the content.

In some embodiments, an application implemented on the user device 304 is configured to make determinations as to whether content provided during the content session satisfies the content preferences of the viewer, and the application may do so in accordance with various embodiments described herein. For example, an application implemented on the user device 304 may be configured to detect certain keywords, certain objects, certain images, and/or the like that may be filtered out of content. As another example, the application may analyze metadata of the content to determine whether or not the content may have been provided to the viewer according to the content preferences of the viewer. As yet another example, the application may generate hashed content portions and compare the hashed content portions to hashed representations of certain content attributes indicated by the content preferences.

In some embodiments, the computing system 302 obtains data that includes user input indicative of whether the content provided to the viewer satisfied the content preferences or not. A survey may be displayed for the viewer periodically throughout the content session or at the conclusion of the content session, and the survey queries the viewer whether portions and attributes of the content that was provided to the viewer satisfied the content preferences of the viewer. Accordingly, the viewer is presented with an opportunity to provide user input indicating whether non-preferred or negatively-preferred content (e.g., content that can be filtered according to the content preferences) was provided to the viewer. Thus, the computing system 302 may monitor the content session based on receiving user input that may be provided in response to a survey or otherwise provided, with the user input providing viewer feedback describing whether any undesirable content was provided to the viewer.

In some embodiments, the computing system 302 monitors content sessions between a content presenter and various users/viewers based on obtaining presenter-side data. For example, a content presenter may transmit a preview of content to the computing system 302 before a content session, or the content presenter may periodically transmit content to the computing system 302 during the content session in parallel to providing content to the viewer. Similar to some embodiments described herein, content or portions/attributes thereof may be hashed by the content presenter before being provided to the computing system 302 to preserve privacy and security of the content. In some embodiments, the computing system 302 may monitor a content session based on a content presenter providing pre-session data that represents modifications made to the content by the content presenter with respect to an original version or form of the content. For example, a content presenter may cause certain keywords to be removed from the content in accordance with viewer content preferences, and the removal of certain keywords from the content may be indicated to the computing system 302. As another example, a content presenter may generate a blurred overlay, a black box, and/or the like to obstruct and redact content portions (e.g., text, images, advertisements, links, etc.), and the content presenter may indicate the addition of such objects to the content to the computing system 302. In yet another example, machine learning models may be used to output a redacted or reduced form of a content, and the content presenter provides metadata and logs related to the execution of the machine learning models to the computing system 302.

Thus, through obtaining data from user devices and/or content presenters, the computing system 302 may monitor content sessions to determine whether content presenters are processing content satisfactory with content preferences before providing content to viewers. In some embodiments, the content presenter provides the content in whole to the computing system 302, and the computing system 302 performs processing and filtering operations so that the computing system 302 provides content satisfactory with viewer content preferences to the viewer. For example, in example use cases and scenarios in which a relatively low volume of users is being served, the computing system 302 may opt to process, filter, and provide content to the users in lieu of the content presenters.

In some embodiments, the computing system 302 stores the results of the monitoring on a blockchain 301 with other historical data for content presenters. Content presenters may be associated with non-fungible tokens stored on the blockchain 301, and a non-fungible token for a content presenter may store monitoring results for a plurality of content sessions. Alternatively, or additionally, the computing system 302 stores the results of the monitoring of the content session on the blockchain 301 with the content preferences of users. In particular, for example, a non-fungible token for a user that stores the content preferences (e.g., defined as one or more content preference conditions) for the user may additionally store a transaction history. The transaction history may describe each instance that the content preferences were accessed, for which content presenter that the content preferences were access, whether the content provided by the content presenter in a subsequent content session satisfied the content preferences. Accordingly, in some embodiments, monitoring results that indicate whether or not a content presenter abided by viewer content preferences may be stored in association with viewer data and/or presenter data on a blockchain 301. In some embodiments, a presenter non-fungible token is updated to store token data that reflects the monitoring of the content session, such as by reflecting a viewer response to a survey.

The computing system 302 performs various operations if, based on the monitoring, the computing system 302 determines that the content provided in the content session failed to satisfy the viewer content preferences that were provided to the content presenter. For example, in some embodiments, a suppression flag (e.g., a suppression flag associated with a time delay, a denial flag, a denial-of-service flag) may be stored on a presenter non-fungible token of a blockchain 301 in response to determining that the content from the content session failed to satisfy the content preference conditions. The suppression flag may be configured to cause the computing system 302 to suppress or deny future requests from the content presenter. In some embodiments, an indication that the content failed to satisfy the content preferences may be transmitted to the viewer. Based on viewer behavior, including persisted interaction with the content despite the content failing to satisfy the content preferences, the computing system 302 may query the viewer (via the user device 304) whether the content preferences may be updated such that the content is instead satisfactory.

With on-chain data describing adherence to content preferences by content presenters being stored on the blockchain, the computing system 302 can efficiently control and govern multiple content presenters, at least with respect to presenter access to user data, presenter access to various services (e.g., API-based services), and/or the like. In some embodiments, the computing system 302 monitors content sessions between content presenters and different users to determine an aggregated preference satisfaction measure for each presenter (e.g., a first presenter with a first aggregated preference satisfaction measure may often provide content that strictly satisfies various viewer content preferences, while a second presenter with a lower measure may frequently provide content that fails to satisfy viewer content preferences), and analytics including trends and rankings for the presenters may be published by the computing system 302 and/or provided to various users.

Operations and services performed by the computing system 302, as well as the technical benefits conferred thereby, may continue as the computing system 302 continues to monitor content sessions between content presenters and viewers and distribute viewer content preferences accordingly. As content preferences are provided to content presenters prior to content sessions and because content preferences are tied to users themselves via non-fungible tokens, content provided to a viewer may more frequently satisfy the content preferences of the viewer, regardless of channel (e.g., a web browser, a mobile app, etc.), device (e.g., the viewer's mobile phone, the viewer's laptop or tablet, etc.), network (e.g., a home network, a mobile wireless network, a public network), or platform (e.g., social media, web, email, streaming service, etc.).

Figure 4:
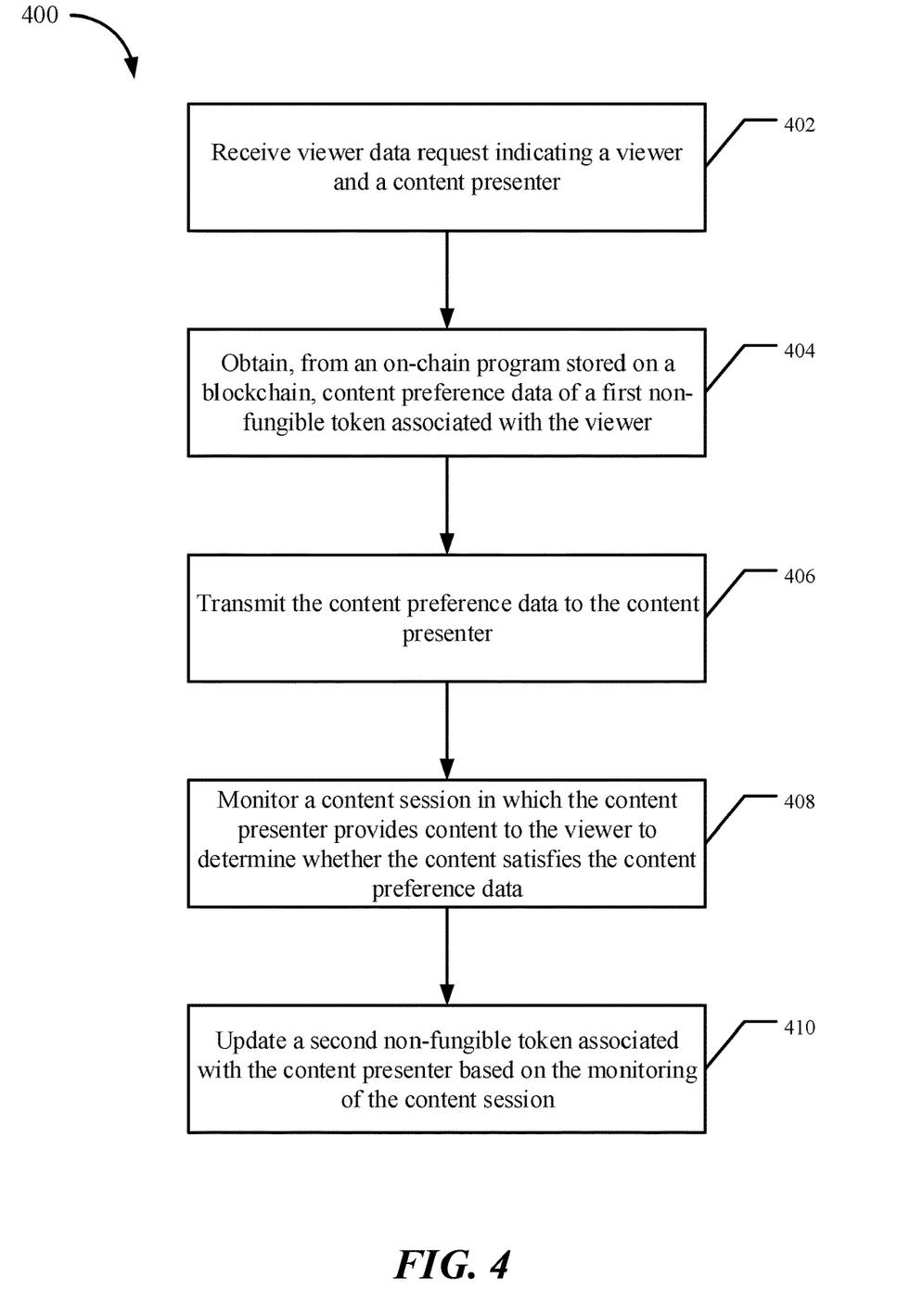
FIG. 4 shows a flowchart of an example method for improving application of user content preferences using blockchain technology while facilitating request suppression/prioritization, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, a viewer data request indicating a viewer and a content presenter is received. As an example, the viewer data request may be received in connection with an anticipated content session in which the content presenter provides content to the viewer. The viewer data request is received from the content presenter, the viewer, or another entity. The viewer data request may indicate the viewer and the content presenter based on indicating a viewer on-chain address of the viewer and a presenter on-chain address of the content presenter. The viewer on-chain address and the presenter on-chain address may respectively refer to a viewer non-fungible token and a presenter non-fungible token stored on a blockchain.

In an operation 404, content preference data for the viewer is obtained. As an example, content preference data for the viewer may indicate content or attributes thereof that the viewer desires to not be provided (e.g., certain keywords, content associated with certain entities, content associated with certain events, content of a certain genre or a certain rating, etc.). Content preference data and other user-specific data for the viewer may be obtained from the viewer non-fungible token in response to the viewer data request, and the viewer non-fungible token is associated with the viewer on-chain address indicated by the viewer data request. The content preference data may be obtained based on querying an on-chain program stored on the blockchain, the on-chain program configured to return the content preference data.

In an operation 406, the content preference data is transmitted to the content presenter. As an example, the content preference data may be transmitted or provided to the content presenter via an API layer.

In an operation 408, a content session between the content presenter and the viewer is monitored. As an example, the monitored content session may be the anticipated content session for which the viewer data request was received. The content session is monitored to detect whether content attributes of content provided during the content session satisfy the content preference data for the viewer.

In an operation 410, the presenter non-fungible token associated with the content presenter is updated. As an example, the presenter non-fungible token is updated in response to the monitoring of the content session indicating that content attributes of the content provided failed to satisfy the content preference data. The presenter non-fungible token may be updated by storing a presenter request suppression flag as part of token data of the presenter non-fungible token. The presenter request suppression flag is configured to cause subsequent viewer data requests involving the content presenter to be suppressed and/or denied.

In some embodiments, the various computers and subsystems illustrated in FIG. 1 may include one or more computing devices (e.g., computing entity 200 shown in FIG. 2) that are programmed to perform the functions described herein. The computing devices may include one or more electronic storages (e.g., storage(s) 204 as illustrated in FIG. 2), one or more physical processors programmed with one or more computer program instructions (e.g., processor(s) 202 as illustrated in FIG. 2), and/or other components. The computing devices may include communication lines or ports to enable the exchange of information within a network or other computing platforms via wired or wireless techniques (e.g., Ethernet, fiber optics, coaxial cable, Wi-Fi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

Although various embodiments of the present disclosure have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques may be better understood with reference to the following enumerated embodiments:

1. A method comprising: receiving a request for user data (e.g., content preference data) of a user; obtaining (e.g., from an on-chain program stored on a blockchain) the user data (e.g., content preferences of the user defined as one or more content preference conditions) of a first non-fungible token associated with the user; transmitting the user data to be provided to a content presenter (e.g., a presenter identified in the request); obtaining content attributes of content provided during a content session via which the content presenter provides content (e.g., video content, audio content, text-based content, and/or the like) for the user; and performing one or more blockchain operations (e.g., storing data describing the content attributes on a second non-fungible token associated with the content presenter) related to the content presenter based on the content attributes from the content session.

2. The method of the preceding embodiment, further comprising: receiving a second request for user data of a user that identifies the content presenter; and denying the second request based on the content attributes of the content provided during the content session failing to satisfy content preference data of the user (e.g., the content included content attributes that were identified as undesirable in the content preference data).

3. The method of any of the preceding embodiments, wherein the content attributes of the content provided during the content session are obtained based on querying the user and receiving a response from the user.

4. The method of the preceding embodiment, wherein the blockchain operations include storing a request suppression flag in a second non-fungible token associated with the content presenter using an on-chain program stored on a blockchain and based on the content attributes failing the satisfy content preference data of the user.

5. The method of any of the preceding embodiments, wherein the request indicates a viewer on-chain address with which a user non-fungible token (e.g., the first non-fungible token associated with the user) is associated and a presenter on-chain address with which a presenter non-fungible token is associated.

6. The method of any of the preceding embodiments, wherein obtaining the content attributes of the content provided during the content session comprises obtaining cryptographic representations of the content provided during the content session and comparing the cryptographic representations of the content with cryptographic representations of undesirable content indicated by content preference data of the user.

7. The method of the preceding embodiment, wherein the cryptographic representations of the content include cryptographic hash values for a content title or identifier, a content classification (e.g., a genre, a rating), and text-based data of the content (e.g., keywords, a text transcription).

8. The method of any of the preceding embodiments, wherein obtaining the content attributes of the content provided during the content session comprises receiving pre-session data that represents modifications to content made by the content presenter.

9. The method of any of the preceding embodiments, further comprising: receiving a request to define user data (e.g., content preferences) for a user; and causing the user data to be stored on a non-fungible token associated with the user and stored on a blockchain.

10. The method of the preceding embodiment, wherein the user data of the first non-fungible token associated with the user is obtained subsequent to obtaining historical data stored on a second non-fungible token associated with the content presenter indicated by the request.

12. A tangible, non-transitory, machine-readable medium storing instructions that, when executed by a data processing apparatus, cause the data processing apparatus to perform operations comprising those of any of the foregoing method embodiments.

13. A system comprising: one or more processors; and memory storing instructions that, when executed by the processors, cause the processors to effectuate operations comprising those of any of the foregoing method embodiments.

What is claimed is:

1. A system for facilitating presenter request suppression via viewer and presenter non-fungible tokens, the system comprising:
  memory storing computer program instructions; and
  one or more processors configured to execute the computer program instructions to effectuate operations comprising:
    in connection with an anticipated content session in which a content presenter provides content to a viewer, receiving a viewer data request for content preferences associated with a viewer on-chain address of the viewer, the viewer data request indicating (i) the viewer on-chain address of the viewer and (ii) a presenter on-chain address of the content presenter;
    in response to the viewer data request, querying an on-chain program stored on a blockchain to obtain, from the on-chain program, viewer content preference conditions of a viewer non-fungible token that is (i) stored on the blockchain and (ii) associated with the viewer on-chain address indicated in the viewer data request;
    transmitting the viewer content preference conditions of the viewer non-fungible token to the content presenter associated with the presenter on-chain address indicated in the viewer data request;
    monitoring, subsequent to the transmitting of the viewer content preference conditions of the viewer non-fungible token, a content session in which the content presenter provides content to the viewer to detect whether content attributes of content provided during the content session satisfy the viewer content preference conditions of the viewer non-fungible token;
    in response to the monitoring of the content session indicating that the content attributes from the content session failed to satisfy the viewer content preference conditions of the viewer non-fungible token, updating a presenter non-fungible token stored on the blockchain and associated with the presenter on-chain address indicated in the viewer data request by storing a presenter request suppression flag as part of non-fungible token data of the presenter non-fungible token;
    receiving a second viewer data request for content preferences associated with a second viewer on-chain address of a second viewer, the second viewer data request indicating (i) the second viewer on-chain address of the second viewer, and (ii) the presenter on-chain address of the content presenter; and
    based on the presenter request suppression flag being stored as part of the non-fungible token data of the presenter non-fungible token associated with the presenter on-chain address, transmitting a response to the second viewer data request that indicates a denial of the second viewer data request.

2. The system of claim 1, wherein the monitoring of the content session comprises querying for and receiving a feedback response from the viewer that indicates whether the content attributes of the content provided during the content session satisfy the viewer content preference conditions.

3. The system of claim 1, wherein storing the presenter request suppression flag comprises querying the on-chain program stored on the blockchain to store the presenter request suppression flag as part of the non-fungible token data of the presenter non-fungible token.

4. A method comprising:
in connection with an anticipated content session in which a content presenter provides content to a viewer, receiving a viewer data request for viewer-specific data of the viewer, wherein the viewer data request indicates the viewer and the content presenter;
in response to the viewer data request, obtaining, via a query to an on-chain program stored on a blockchain, content preference data of a first non-fungible token that is (i) stored on the blockchain and (ii) associated with the viewer indicated in the viewer data request;
transmitting the content preference data of the first non-fungible token to be provided to the content presenter indicated in the viewer data request;
monitoring, subsequent to the transmitting of the content preference data of the first non-fungible token, a content session, via which the content presenter provides content for the viewer, to determine whether content attributes of content provided during the content session satisfy the content preference data of the first non-fungible token;
in response to the monitoring of the content session indicating that the content attributes from the content session failed to satisfy the content preference data of the first non-fungible token, updating a second non-fungible token stored on the blockchain and associated with the content presenter indicated in the viewer data request by storing a presenter request suppression flag as part of non-fungible token data of the second non-fungible token;
receiving a second viewer data request for viewer-specific data of a second viewer, wherein the second viewer data request indicates the second viewer and the content presenter; and
based on the presenter request suppression flag being stored as part of the non-fungible token data of the second non-fungible token associated with the content presenter, transmitting a response to the second viewer data request that indicates a denial of the second viewer data request.

5. The method of claim 4, wherein the viewer data request indicates a viewer on-chain address with which the first non-fungible token is associated and a presenter on-chain address with which the second non-fungible token is associated.

6. The method of claim 4, wherein:
the monitoring of the content session comprises querying for and receiving a viewer response that indicates whether the content attributes of the content provided during the content session satisfy the content preference data, and
the second non-fungible token is updated to reflect the viewer response.

7. The method of claim 4, wherein monitoring the content session comprises:
obtaining one or more cryptographic hash representations of the content provided during the content session; and
determining whether the content attributes of the content provided during the content session satisfy the content preference data based on determining whether the one or more cryptographic hash representations of the content satisfy corresponding cryptographic representations of the content preference data.

8. The method of claim 7, wherein the one or more cryptographic hash representations of the content include at least one of a first cryptographic hash value corresponding to a content title or identifier, a second cryptographic hash value corresponding to a content classification, or a plurality of cryptographic hash values corresponding to a plurality of text-based data of the content.

9. The method of claim 4, wherein monitoring the content session comprises:
receiving pre-session data that represents modifications made, by the content presenter, to the content provided during the content session with respect to an original form of the content, and
determining whether the content attributes of the content provided during the content session satisfy the content preference data based on the pre-session data.

10. The method of claim 4, further comprising:
receiving a preference defining request that indicates the viewer and comprises the content preference data, wherein the content preference data is generated by the viewer; and
querying the on-chain program stored on the blockchain to store the content preference data as part of token data of the first non-fungible token associated with the viewer.

11. The method of claim 4, wherein the content preference data of the first non-fungible token is obtained subsequent to obtaining, from the on-chain program stored on the blockchain, token data of the second non-fungible token stored on the blockchain and associated with the content presenter indicated in the viewer data request.

12. One or more non-transitory computer-readable media storing instructions that, when executed by one or more processors, cause operations comprising:
in connection with an anticipated content session in which a content presenter provides content to a user, receiving a request for user data of the user, the request indicating the user and the content presenter;
in response to the request, obtaining, via a query to an on-chain program stored on a blockchain, content preference data of a first non-fungible token associated with the user;
transmitting the content preference data of the first non-fungible token to be provided to the content presenter indicated in the request;
monitoring, subsequent to the transmitting of the content preference data of the first non-fungible token, a content session via which the content presenter provides content for the user to determine whether content attributes of content provided during the content session satisfy the content preference data of the first non-fungible token;
in response to the monitoring of the content session indicating that the content attributes from the content session failed to satisfy the content preference data of the first non-fungible token, updating a second non-fungible token stored on the blockchain and associated with the content presenter indicated in the request by storing a presenter request suppression flag as part of non-fungible token data of the second non-fungible token;

receiving a second request for user data of a second user, wherein the second request indicates the second user and the content presenter; and based on the presenter request suppression flag being stored as part of the non-fungible token data of the second non-fungible token associated with the content, transmitting a response to the second request that indicates a denial of the second request.

13. The one or more non-transitory computer-readable media of claim 12, wherein the operations further comprise:

obtaining content attributes of content provided during one or more other content sessions via which the content presenter provides content to one or more other users;

determining a presenter score for the content presenter based on comparing the content attributes with the content preference data of the first non-fungible token; and storing the presenter score for the content presenter in the second non-fungible token associated with the content presenter.

14. The one or more non-transitory computer-readable media of claim 13, the operations further comprising:

transmitting the response to the second request that indicates the denial of the second request further based on the presenter score failing to satisfy a threshold.

15. The one or more non-transitory computer-readable media of claim 12, the operations further comprising:

receiving a preference defining request that indicates the user and comprises the content preference data, wherein the content preference data is generated by the user; and querying the on-chain program stored on the blockchain to store the content preference data as part of token data of the first non-fungible token associated with the user.

16. The one or more non-transitory computer-readable media of claim 15, wherein the preference defining request indicates a cryptographic authentication key associated with the user and used by the on-chain program to authenticate the storing of the content preference data.

17. The one or more non-transitory computer-readable media of claim 12, wherein the request indicates the user based on including an on-chain address with which the first non-fungible token is associated.

\* \* \* \* \*